United States Patent [19]

Iverson, Jr. et al.

[11] Patent Number: 5,072,612
[45] Date of Patent: Dec. 17, 1991

[54] SYSTEM FOR DETERMINING POSITION OF NORMAL SHOCK IN SUPERSONIC FLOW

[75] Inventors: Donald G. Iverson, Jr., Vashon; Troy D. Daiber, Kirkland, both of Wash.

[73] Assignee: The Boeing Company, Seattle, Wash.

[21] Appl. No.: 564,539

[22] Filed: Aug. 7, 1990

[51] Int. Cl.⁵ .......................................... G01M 19/00
[52] U.S. Cl. .................................... 73/118.2; 73/147; 356/129
[58] Field of Search .................. 73/116, 117.4, 118.2, 73/147; 250/231.19; 356/129

[56] References Cited

U.S. PATENT DOCUMENTS

| | | | |
|---|---|---|---|
| 2,971,330 | 2/1961 | Clark | 60/35.6 |
| 3,623,361 | 11/1969 | Funk, Jr. | 73/147 |
| 3,642,017 | 2/1972 | Homes | 73/700 |
| 3,693,015 | 9/1972 | Funk, Jr. | 356/129 |
| 3,714,827 | 2/1973 | Batts | 73/147 |

OTHER PUBLICATIONS

Bandef et al., "An Improved Laser-Schlierem System for Measurement of Shock-Wave Velocity", Rev. Sci. Instrum., vol. 7, Jul. 1974.

Primary Examiner—Donald O. Woodiel
Attorney, Agent, or Firm—Joan H. Pauly

[57] ABSTRACT

Light from a plurality of light emitting diodes is transmitted through optical cables (12) to a lens system. The lenses (56, 58) expand and collimate the light and project it in a sheet (16) across the supersonic inlet of an aircraft power plant perpendicular to incoming airflow. A normal shock bends a portion of the sheet of light (16). A linear array of a multiplicity of optical fiber ends collects discrete samples of light. The samples are processed and compared to a predetermined profile to determine the shock location.

20 Claims, 9 Drawing Sheets

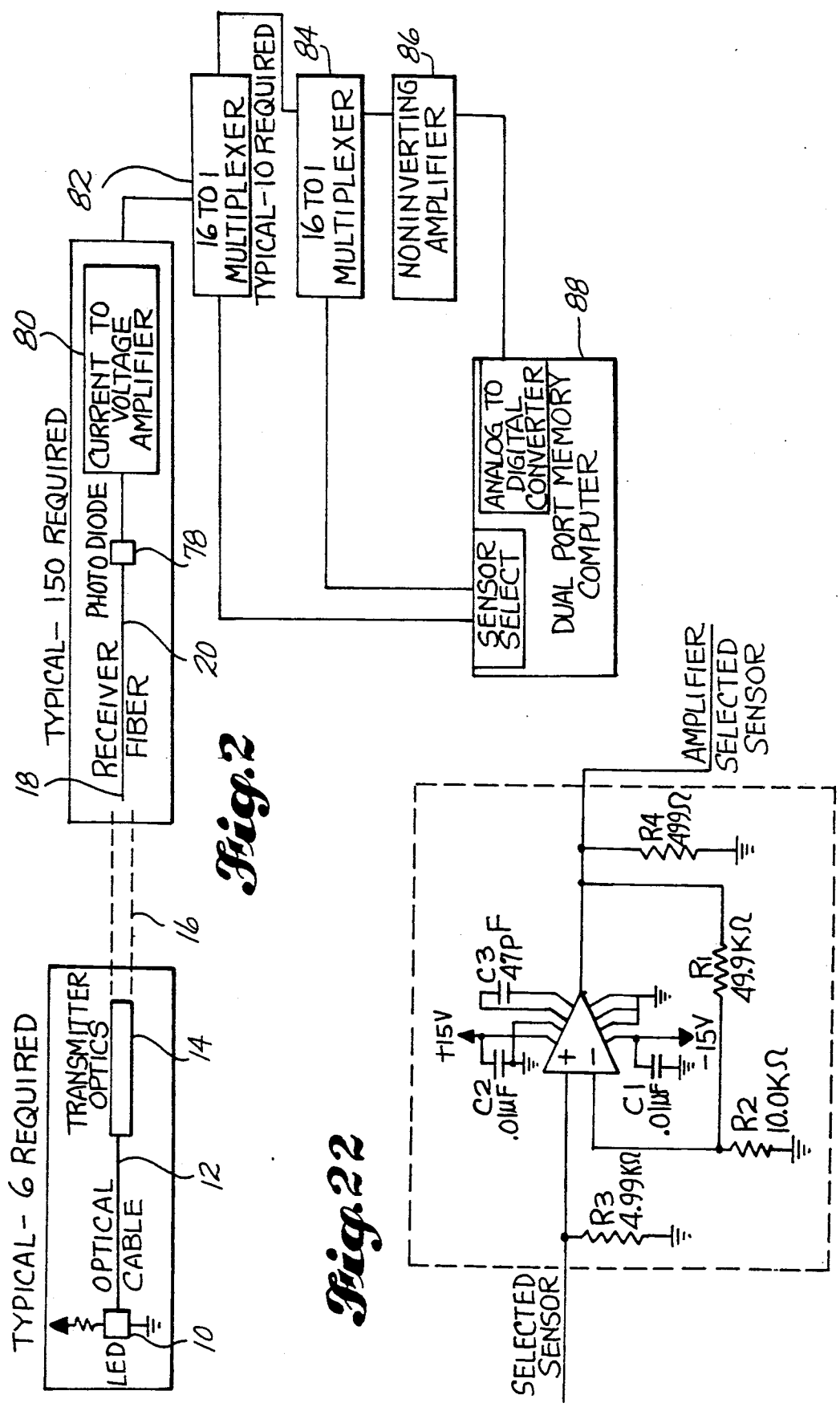

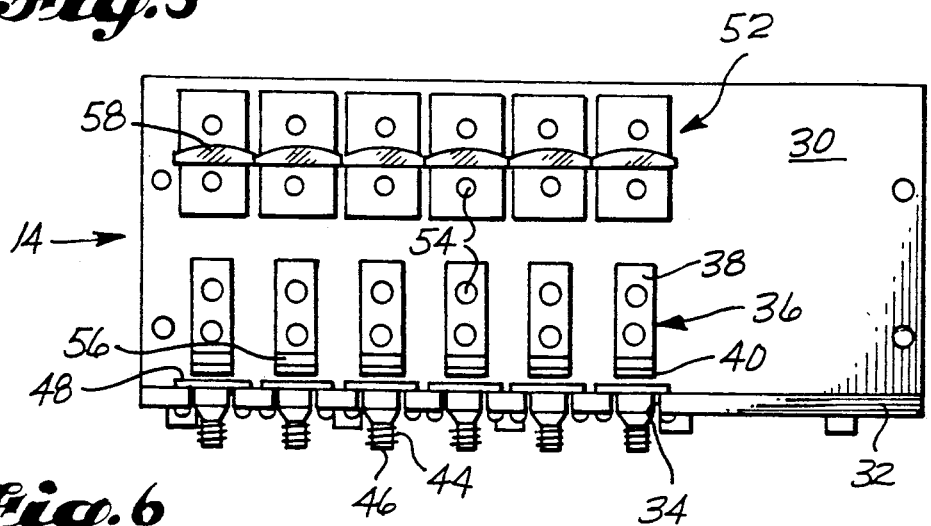
Fig. 5
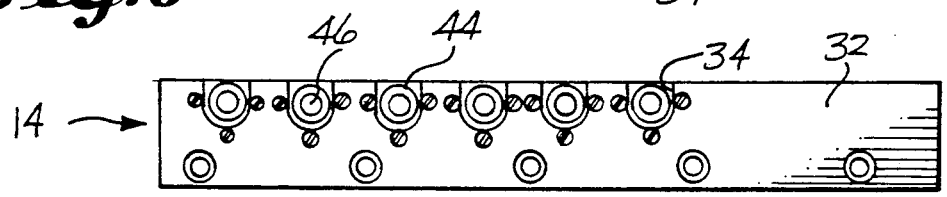
Fig. 6
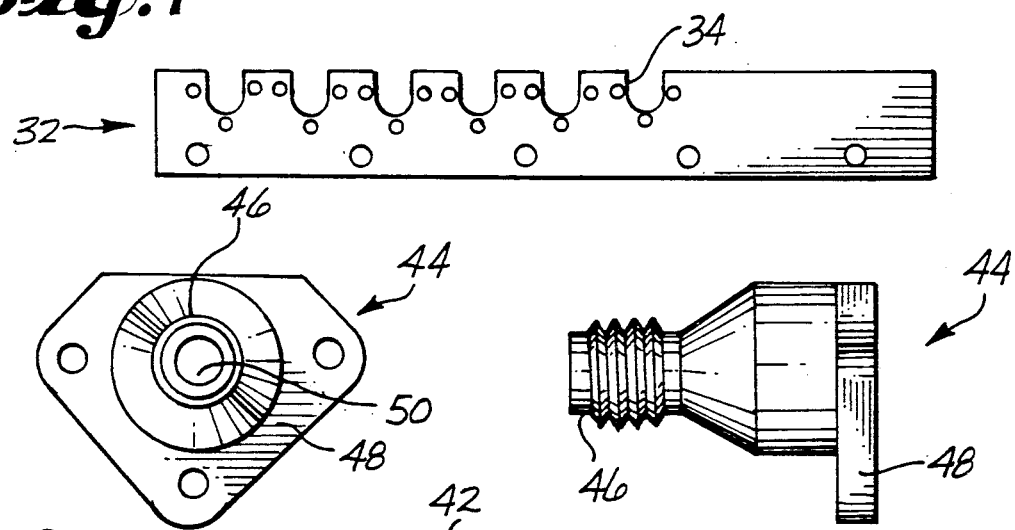
Fig. 7
Fig. 8
Fig. 9
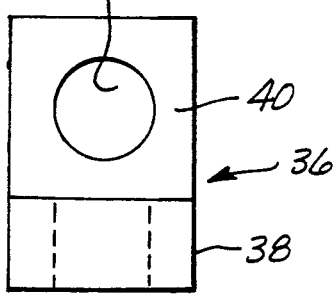
Fig. 10

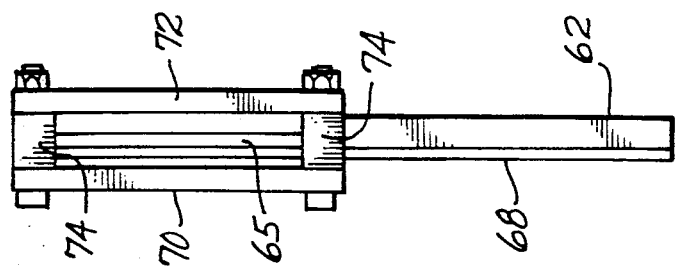
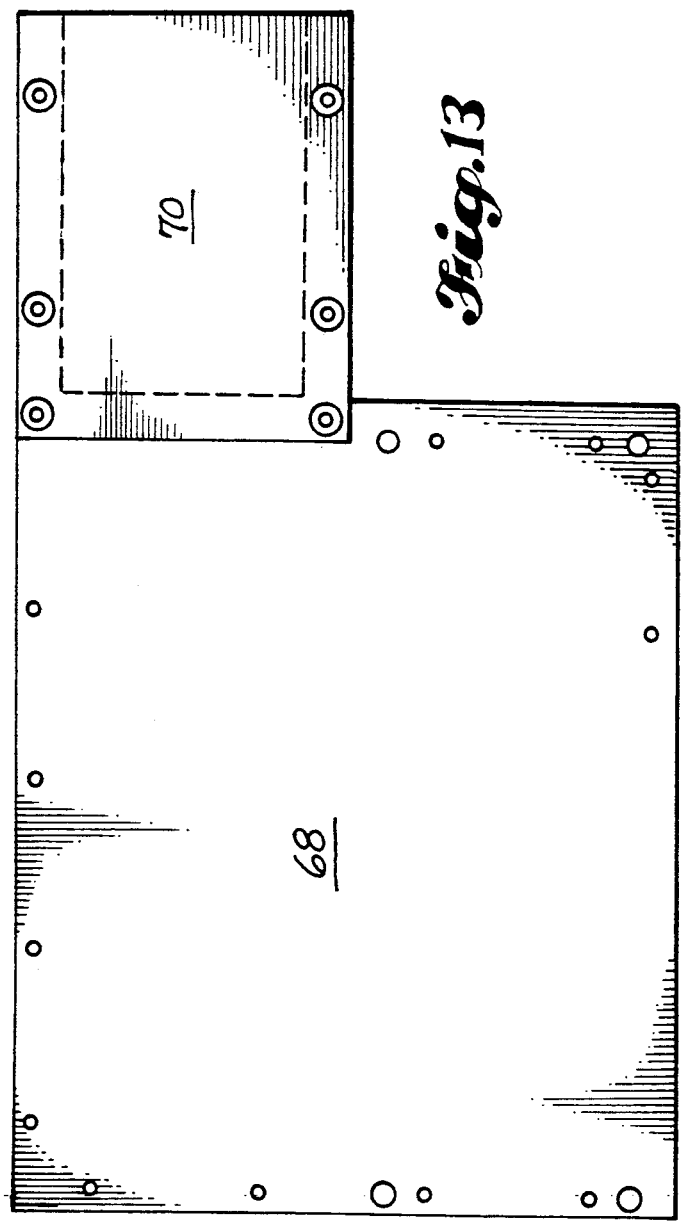
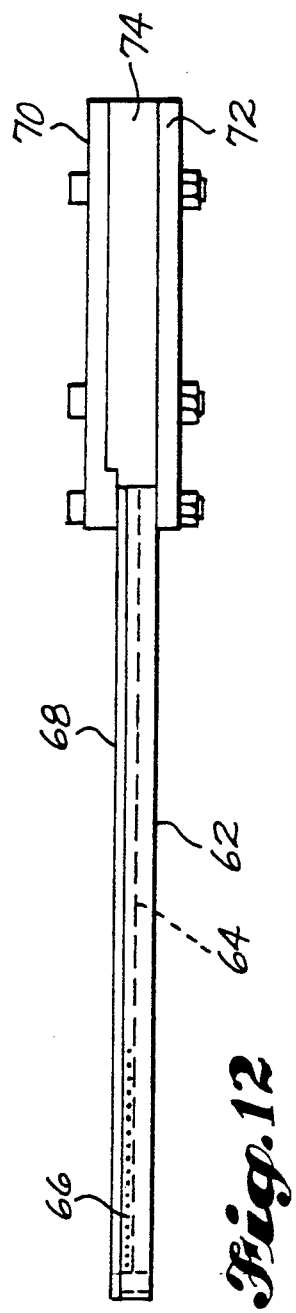

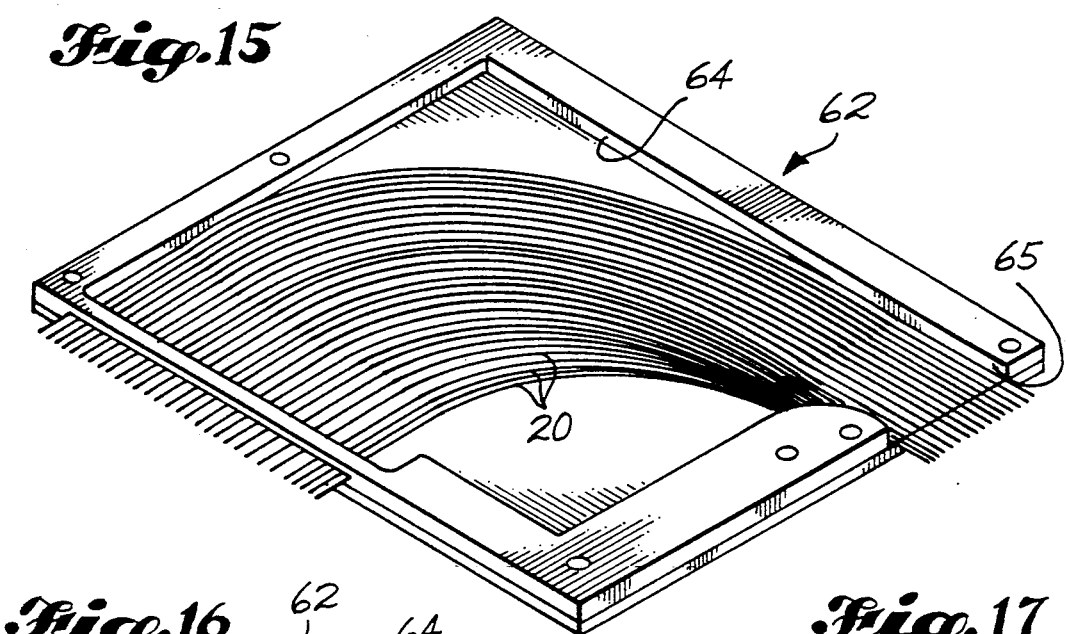
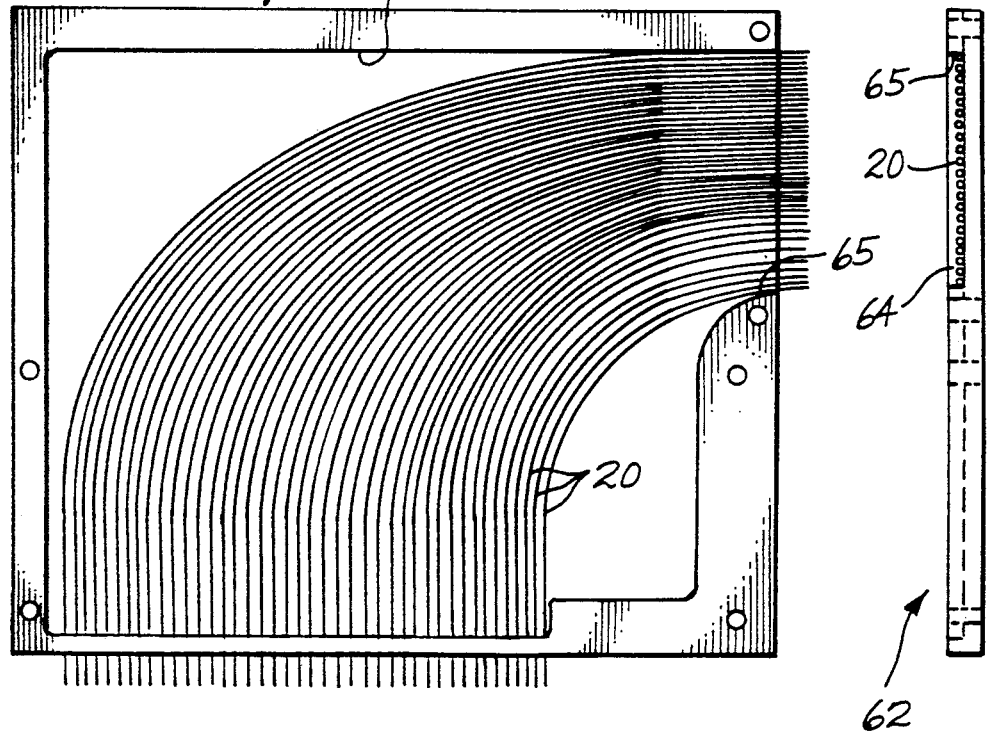
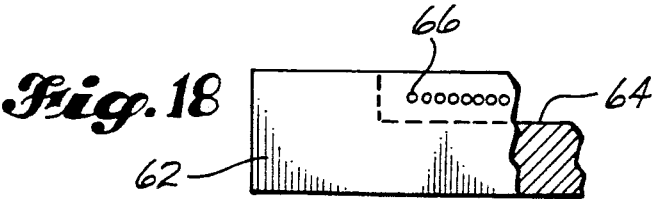

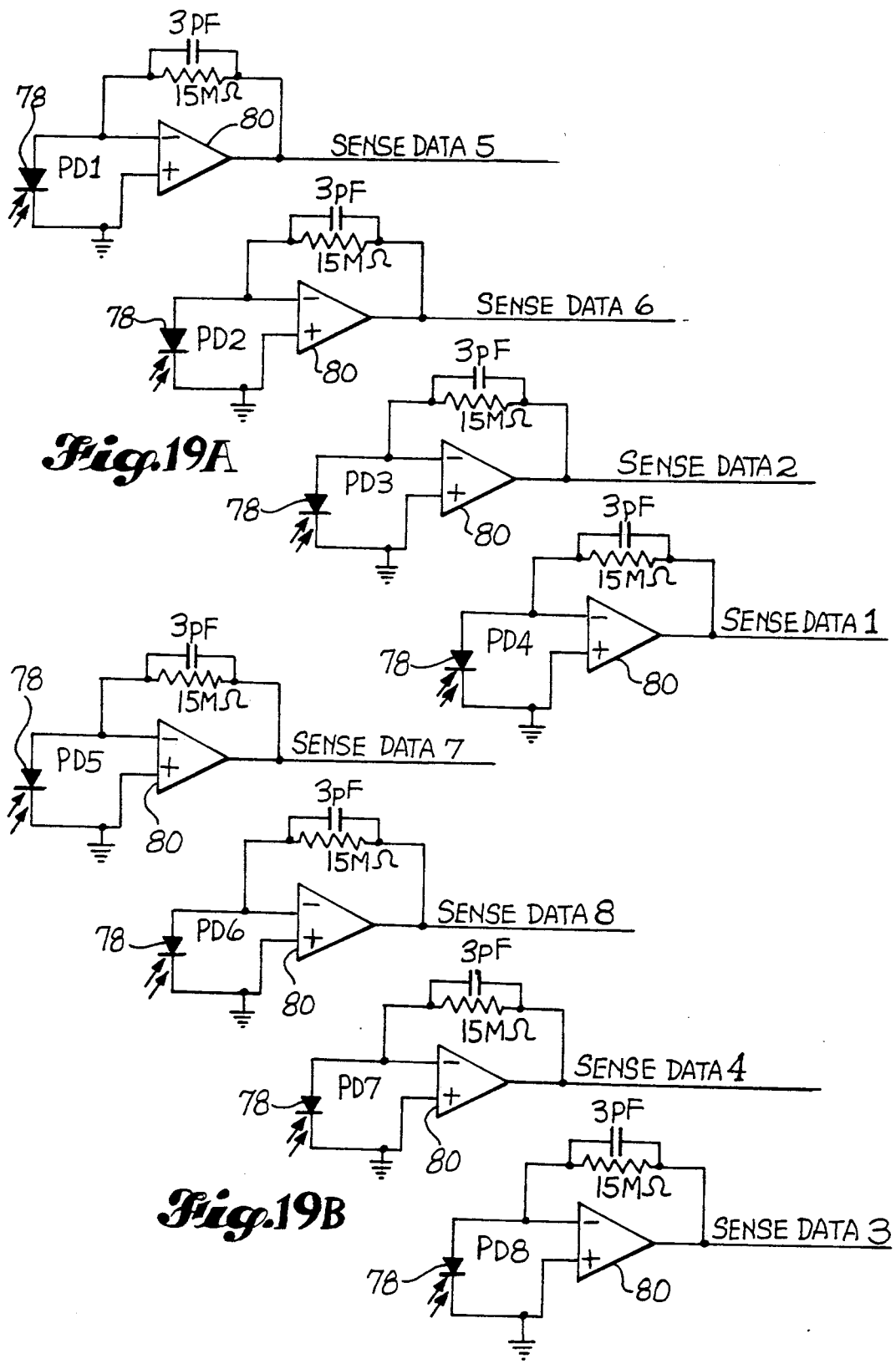

SYSTEM FOR DETERMINING POSITION OF NORMAL SHOCK IN SUPERSONIC FLOW

GOVERNMENT RIGHTS

The invention described herein was made in the performance of work under NASA Contract No. NAS3-25447, and is subject to the provisions of Section 305 of the National Aeronautics and Space Act of 1958, as amended (42 U.S.C. 2457).

TECHNICAL FIELD

This invention relates to inlet control systems of supersonic aircraft and, more particularly, to a system for accurately determining the position of a normal shock in a supersonic inlet of an aircraft power plant by projecting a sheet of light across the inlet and observing the bending of a portion of the sheet by the shock.

BACKGROUND INFORMATION

In supersonic inlets of aircraft power plants, a normal shock must be maintained to decelerate the inflowing captured airstream before it enters the engine This is necessary in order to maintain stable operation of the engine. Various types of inlet control systems are known for adjusting the inlet to maintain the normal shock in an acceptable position in the inlet. The particular desired shock location and the range of movement of the shock permissible depends on the particular type of engine. In order to maintain the shock in the required position, the inlet control system must have accurate input representing the current position of the shock.

Since the location of the normal shock is very sensitive to the free stream Mach number, altitude, vehicle speed, engine flow rate, and other factors, it must be continually monitored to provide feedback to the inlet control system. Most prior approaches to solving the problem of providing accurate measurement and communication of the shock location have been based on the effect of the normal shock on static pressure. There is a sudden increase in static pressure which occurs as the incoming flow in the inlet crosses the normal shock. The approach of basing the shock location measurement on the detection of this increase in static pressure is complicated by the presence of small oblique shocks along the inlet walls. The pressure changes from these relatively minor shocks are detected as noise which limits the resolution of the measurement of the normal shock location to about an inch. In many situations, a much higher degree of accuracy is desired.

U.S. Pat. No. 2,971,330, granted Feb. 14, 1961, to J. W. Clark, discloses a sound shook locator and control system for positioning the shock in high speed air inlets for aircraft power plants. In the disclosed system, a sound generator and a receiver are placed in the inlet in the flow path downstream of the shock location. The sound generator directs a high frequency sound upstream toward the normal shock. The receiver senses the echo of the sound reflected by the shock. Signals from the generator and receiver are processed by an acoustic system which sends a resultant signal to an inlet geometry control for adjusting the position of the shock.

U.S. Pat. No. 3,623,361, granted Nov. 30, 1971, to B. H. Funk, Jr., discloses a method and apparatus for measuring the statistical properties of turbulence in supersonic flows. The system measures both translational and rotational aspects of the turbulent motion. The method includes projecting a first beam of collimated light and detecting deflections in the beam, projecting a second beam of collimated light and detecting deflections in the second beam, and correlating the characteristics of the deflections of the first and second beams to determine the characteristics of the turbulence. The apparatus for detecting the deflection of each beam includes a photodetector with a knife edge positioned in front of it to cut off about 50 percent of the light.

U.S. Pat. No. 3,714,827, granted Feb. 6, 1973, to C. N. Batts, discloses a measurement circuit to obtain buffet data from wind tunnel models. The information is used in the design of aerodynamic vehicles.

DISCLOSURE OF THE INVENTION

A subject of the invention is a method of detecting a normal shock in supersonic air flow. According to a basic aspect of the invention, the method comprises providing an array of sensors extending substantially parallel to the flow. A sheet of light is projected across the flow toward the array and perpendicular to the flow. The shook bends a portion of the sheet of light. An intensity profile of the sheet of light is sensed through the array. This profile is compared with a predetermined base line profile corresponding to a no-shook condition. A position of the normal shock is identified by identifying sensors with an intensity level deviating from the base line profile. Preferably, the sheet of light is collimated.

The method may be used to detect a normal shock in intake flow in a supersonic inlet of an aircraft power plant. The sensors are positioned along a sidewall of the inlet, and the sheet of light is projected across the inlet. The shock position is communicated to an inlet control system.

The light source and the circuitry for processing light input into the array of sensors may be located in the sidewall structure of the inlet consistently with the invention. However, it is preferable that these elements be located remotely from the inlet to protect them from severe inlet environmental conditions and to minimize the amount of space occupied by the detection system in the area of the inlet. A preferred feature of the invention is providing an array of sensors that comprises an array of optical fiber ends positioned to collect discrete samples of the sheet of light. These samples may be transmitted by the optical fibers for processing at a remote location Another preferred feature of the invention comprises carrying incoming light through an optical fiber from a remote light source to the vicinity of the inlet, and expanding the incoming light into the sheet of light.

The apparatus of the invention basically comprises an array of light sensors, a projector, and means for comparing and for identifying. The array is positioned along a sidewall of the inlet and extends substantially parallel to the intake flow in the inlet. The projector is positioned to project a sheet of light across the inlet toward the array and perpendicular to the flow. The means for comparing and identifying compares an intensity profile obtained through the sensors with a predetermined profile. It also identifies a position of the normal shook by identifying sensors with an intensity level deviating from the predetermined profile.

The method and apparatus of the invention detect the position of the normal shock by detecting the sudden increase in the index of refraction of the air in the intake flow caused by the rise in air density across the shock. The use of light to detect the shock allows detection in the middle of the inlet where the flow is unaffected by the boundary layer and oblique shocks. Therefore, the location of the normal shock can be determined with a high degree of accuracy. The use of light also avoids any disturbance of the flow by the detection system. Other advantages of the system of the invention are its relatively simple structure and ease of operation and maintenance.

These and other advantages and features will become apparent from the detailed description of the best mode for carrying out the invention that follows:

BRIEF DESCRIPTION OF THE DRAWINGS

In the drawings, like element designations refer to like parts throughout, and:

FIG. 2 is a more detailed schematic diagram of the system shown in FIG. 1.

FIG. 5 is a top plan view of the projector shown in FIGS. 3 and 4.

FIG. 6 is a front elevational view of the projector shown in FIGS. 3-5.

FIG. 7 is a front elevational view of the face plate shown in FIGS. 3-6.

FIG. 8 is an elevational view of the SMA receptacle shown in FIGS. 3-6, looking toward the threaded end.

FIG. 9 is a side elevational view of the receptacle shown in FIG. 8.

FIG. 10 is a rear elevational view of one of the lens mounts shown in FIGS. 3-5.

FIG. 12 is an elevational view of the preferred embodiment of the receiver, looking in the direction of incoming light.

FIG. 13 is a top plan of the receiver shown in FIG. 12.

FIG. 14 is a side elevational of the receiver shown in FIGS. 12 and 13.

FIG. 15 is a pictorial view looking down on the block portion of the receiver, with the cover removed.

FIG. 16 is a top plan view of the block.

FIG. 17 is a side elevational view of the block.

FIG. 18 is an enlarged fragmentary elevational view of a corner portion of the block through which the light receiving fiber ends project.

FIGS. 19A and 19B are circuit diagrams of portions of the preferred embodiment of the photodiode circuits.

FIG. 22 is a circuit diagram of the amplifier that amplifies the signal from the multiplexers into the computer in the preferred embodiment.

BEST MODE FOR CARRYING OUT THE INVENTION

Figure 1:
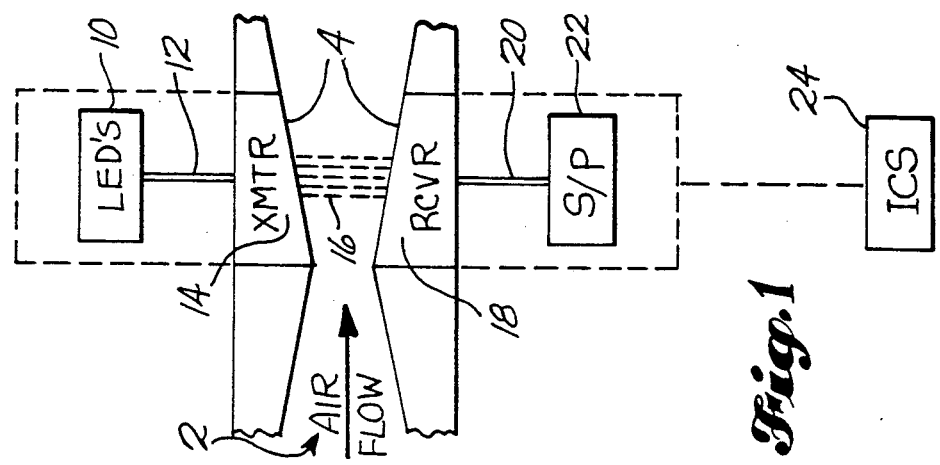
FIG. 1 is a schematic diagram of the preferred embodiment of the system and a supersonic inlet of an aircraft power plant.

The drawings show apparatus that is constructed according to the invention and that constitutes the best mode of the apparatus of the invention currently known to the applicants. The drawings also illustrate the best mode for carrying out the method of the invention currently known to the applicants. In FIG. 1, a supersonic inlet 2 of an aircraft power plant is shown in schematic form. The method and apparatus of the invention may be used to advantage in connection with a variety of types of supersonic inlets and inlet flow control systems. The type of inlet 2 shown in FIG. 1 is only one example of such an inlet. The inlet 2 is shown schematically herein in order to facilitate the illustration of the main components of the apparatus of the invention and the carrying out of the method of the invention. The method and apparatus of the invention may also be used to advantage in other environments where the position of a normal shock is important. One example of such an environment is a wind tunnel.

Referring to FIG. 1, the inlet 2 has a sidewall 4 defining a flow passageway through which air from the atmosphere is drawn into the engine (not shown). Two main components of the apparatus of the preferred embodiment, the transmitter or projector 14 and the receiver 18, are positioned in diametrically opposite portions of the sidewall 4. The projector 14 and receiver 18 are positioned downstream of the engine and are aligned with the desired location of the normal shock in the intake flow. As shown in FIG. 1, a remote light source 10 is connected to the projector 14 by optical cables 12. The receiver 18 is connected to a signal processor circuit 22 by optical cables 20. The cables 12, 20 comprise optical fibers with protective jackets. A signal from processor circuit 22 is communicated to the inlet control system 24. The projector 14 projects a sheet of light 16 across the inlet perpendicular to the airflow and toward the receiver 18. The shock bends a portion of the sheet of light 16. The light received by the receiver 18 is compared to a baseline profile corresponding to a no-shock condition to determine the shock location.

FIG. 2 is a more detailed schematic diagram of the preferred embodiment of the system. The light source 10 comprises a plurality of light emitting diodes (LED's), each of which is connected by an optical cable 12 to the transmitter optics of the projector 14. In the illustrated embodiment, the transmitting system has six identical units comprising an LED 10 connected by an optical cable 12 to its own set of transmitting lenses 56, 58. This arrangement of six transmitting units was chosen for the construction of a specific test system. The system produced a usable sheet of light about six inches wide (in the direction of flow) and about one quarter inch high. The width of the sheet of light 16 was chosen to correspond to the predetermined permissible range of shock locations. In each application of the system, the width should, of course, be adjusted to the permissible range of shock locations for the particular power plant.

Figure 11:
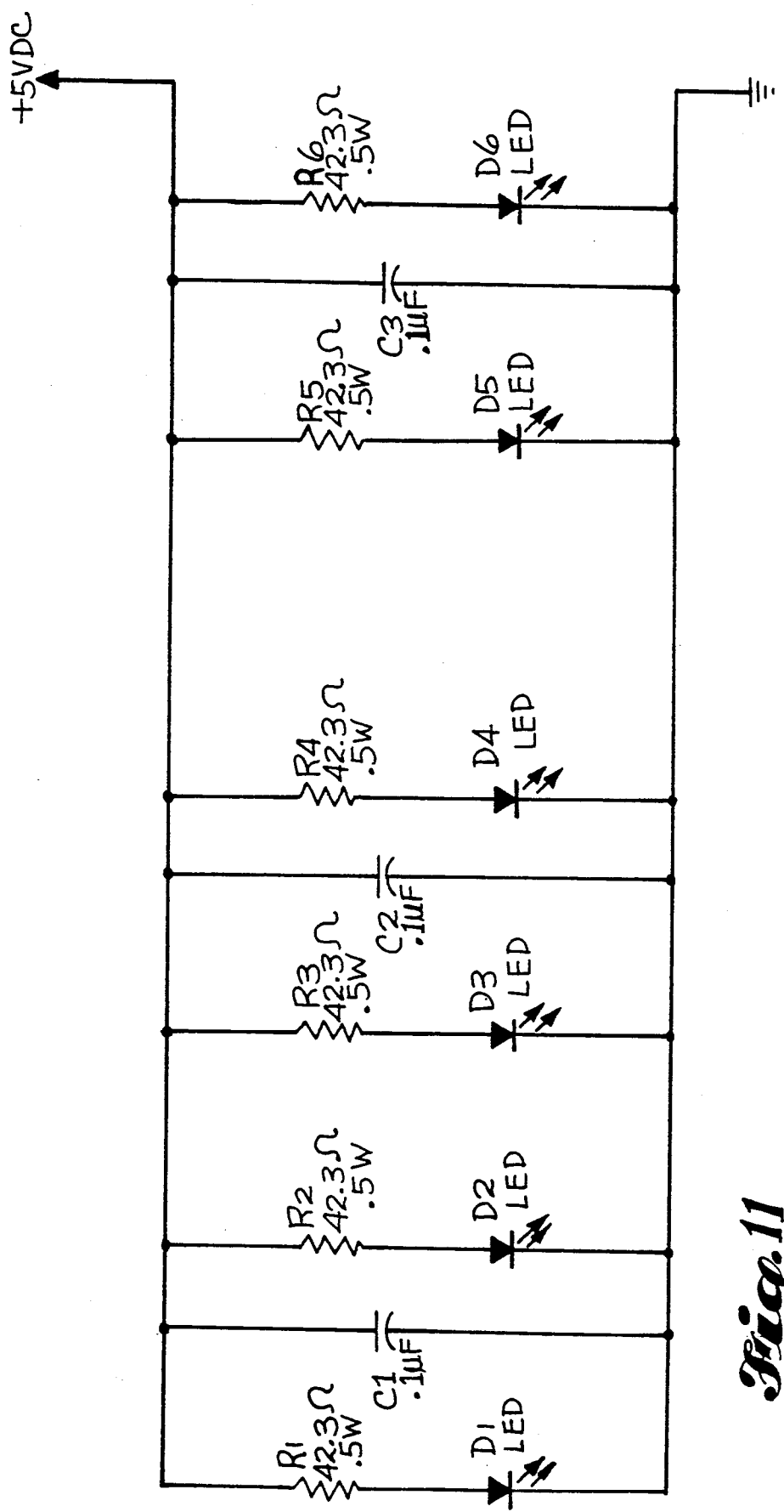
FIG. 11 is a circuit diagram of the preferred embodiment of the light source.

The LED circuit is shown in FIG. 11. It is a standard type of circuit with a +5 volt direct current input and six identical LED circuit branches with LED's D1-D6 and resistors R1-R6, respectively. The defining parameters of each LED are 70 microwatts power into a 50 micron fiber at 100 milliamperes, with a peak wavelength of 850 nanometers. Capacitors C1-C3 are associated with the LED branch circuits to control the current input into the LED's in a known manner. In the illustrated embodiment, the LED's produce infrared light that is transmitted to the sensors in the receiver 18. The LED's were chosen on the basis of their commercial availability and the fact that they produce a desired intensity. Other portions of the light spectrum could also be used in practicing the invention.

Figure 3:
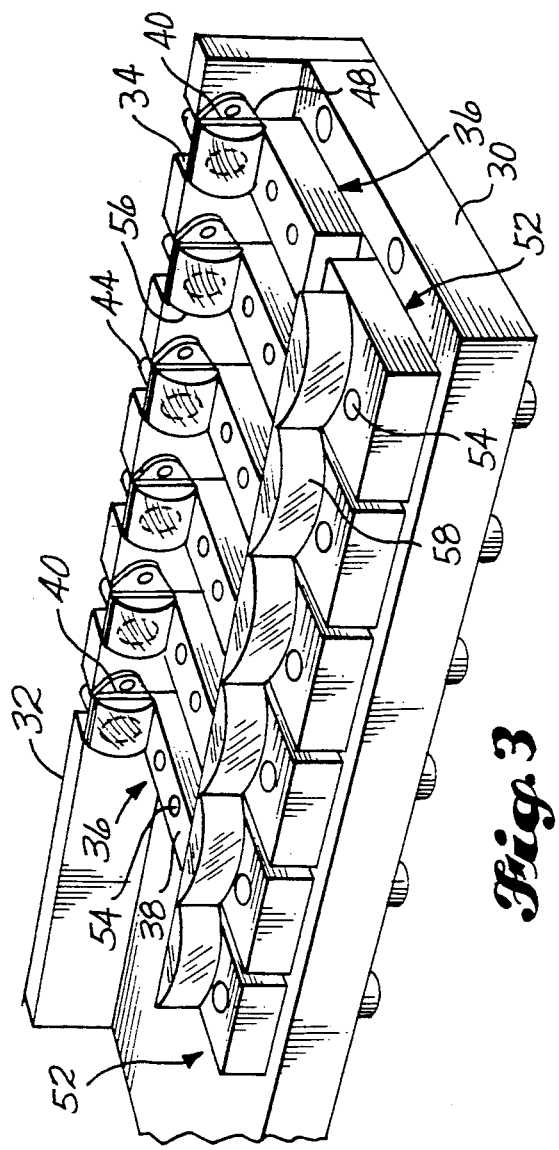
FIG. 3 is a pictorial view of the preferred embodiment of the projector portion of the system.
Figure 4:
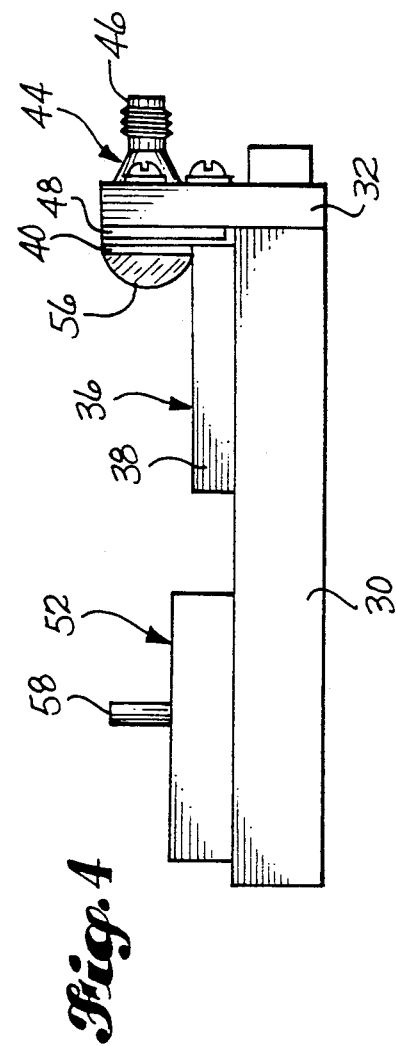
FIG. 4 is a side elevational view of the projector shown in FIG. 3.

FIGS. 3-10 illustrate the currently preferred embodiment of the projector 14. Referring to FIGS. 3-5, the projector 14 includes a base 30 and a face plate 32. The face plate 32 has six arcuate cutouts 34, best seen in FIG. 7, corresponding to the six units of the projector 14. Each unit includes a standard SMA receptacle 44 that extends through the corresponding cutout 34, as shown in FIGS. 4-6. The structure of the receptacle 44 is shown in FIGS. 8 and 9. The receptacle 44 has a threaded end 46 to which the optical cable 12 is connected in a known manner, and a mounting flange 48 that is secured to the face plate 32 by suitable fasteners. The upper portion of the flange 48 has been machined down so that it does not project above the top of the face plate 32. Light from the LED 10 is transmitted by the cable 12 through an opening 50 in the receptacle 44. The light from the receptacle 44 is directed by a pair of lenses 56, 58. The lenses 56, 58 expand the light into the sheet 16 and collimate the light.

As best seen in FIGS. 3-5, the lenses 56, 58 of each projector unit are mounted on the base 30 by means of two lens mounts 36, 52. The first lens mount 36 has a horizontal mounting portion 38 which is secured to the base 30 by suitable fasteners 54. A vertical lens support 40 extends upwardly and perpendicularly from the horizontal portion 38. The lens support 40 has a circular opening 42 (FIG. 10) extending therethrough to permit the passage of light. The lens 56 is adhesively secured to the support 40 and covers the opening 42. The second lens mount 52 is a simple block which is secured to the base 30 by fasteners 54. The second lens 58 is adhesively secured to the mount 52 in an upright position. In the illustrated embodiment, the first lens 56 is a cylindrical lens with dimensions of 1.025 inch by 0.3 inch and a focal length of 3.0 inches. The second lens 58 is also a cylindrical lens and has dimensions of 0.50 inch by 0.50 inch and a focal length of 0.50 inch. As shown in FIGS. 3 and 4, the lens orientations are perpendicular to each other to produce the desired configuration of the sheet of light 16.

In the system of the invention, the receiver 18 includes an array of sensors positioned along a sidewall of the inlet. The array extends substantially parallel to the airflow through the inlet into the engine. In the preferred embodiment, each sensor consists simply of an optical fiber end of an optical cable 20. As shown in FIG. 2, the optical fiber of each of the cables 20 transmits the light received to a corresponding photodiode 78. The electrical signals from the photodiodes 78 are processed as illustrated in FIG. 2 and discussed further below.

FIGS. 12-18 illustrate the currently preferred embodiment of the receiver 18 which has been built and tested. The receiver 18 includes a receiver block 62 for mounting the ends of the fiber optical cables 20. In the illustrated embodiment, the array of fibers includes 150 fibers. This number of fibers spaced over the six inch width of the sheet of light 16 provides approximately one fiber per millimeter of expected shook travel. This spacing of the fibers results in the shadow of the shook falling across at least one fiber end, and usually two or three fiber ends at any given time. Therefore, the shook location can always be observed with a high degree of accuracy. In general, the number of sensors in the system of the invention is preferably sufficient to extend across the entire expected range of shock travel with the spacing between sensors being less than the expected minimum width of the shock.

Referring to FIGS. 12 and 15-18, the block 62 has a cavity 64 for receiving the optical cables 20. The ends of the fibers are received into holes 66 that extend through a sidewall of the block 62 in a linear array. There are 150 holes 66 to receive the 150 fiber ends. The block 62 is provided with a cover 68 (FIGS. 12-14) to protect the cables 20. Each cable 20 extends from its end in hole 66 rearwardly and laterally through the cavity 64 and out through a lateral opening 65 in the block sidewall communicating with the cavity 64 (FIGS. 15-17). The cables 20 extend out through a block extension, formed by a top plate 70, bottom plate 72, and two end plates 74, and to a remote location where the light is converted to electrical signals by photodiodes 78 and processed.

FIGS. 19A and 19B are a circuit diagram of a representative portion of the photodiode circuits in the illustrated embodiment. Eight of the 150 photodiodes 78 are shown in FIGS. 19A and 19B. Each photodiode 78 has an active area of 3.2 millimeters squared, a peak response wavelength of 850 nanometers, and a gain of 0.5 amperes per watt. The photodiodes 78 are arranged in groups of four, with each group being associated with a quad current-to-voltage amplifier 80. A single amplifier 80 is represented in each of FIGS. 19A and 19B. It appears four times to facilitate the illustration of its relationship to each of the four photodiodes 78. The illustrated amplifier 80 is a high gain-bandwidth product quad operational amplifier with a gain of −15 volts per microampere. As shown, the first group of photodiodes in FIG. 19A receive light from the first, second, fifth, and sixth fibers in the linear array shown in FIGS. 15-17. The second group in FIG. 19B receives light from the third, fourth, seventh, and eighth fibers. This arrangement was chosen for convenience since it facilities mounting of the circuit elements on a circuit board.

Figure 20:
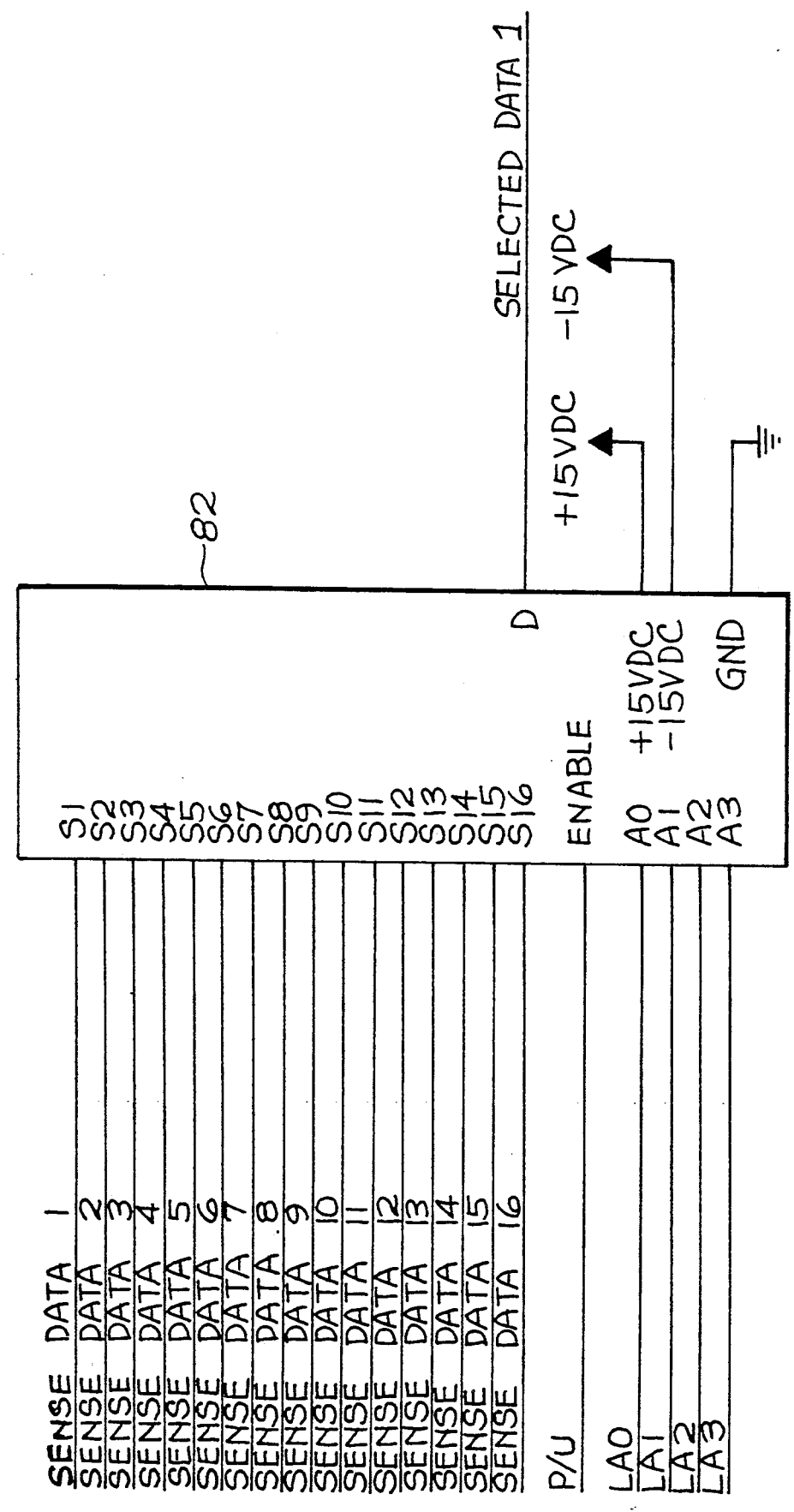
FIG. 20 is a schematic diagram illustrating the input into and output from one of the ten multiplexers in the first tier of multiplexers in the preferred embodiment of the signal processing portion of the system.
Figure 21:
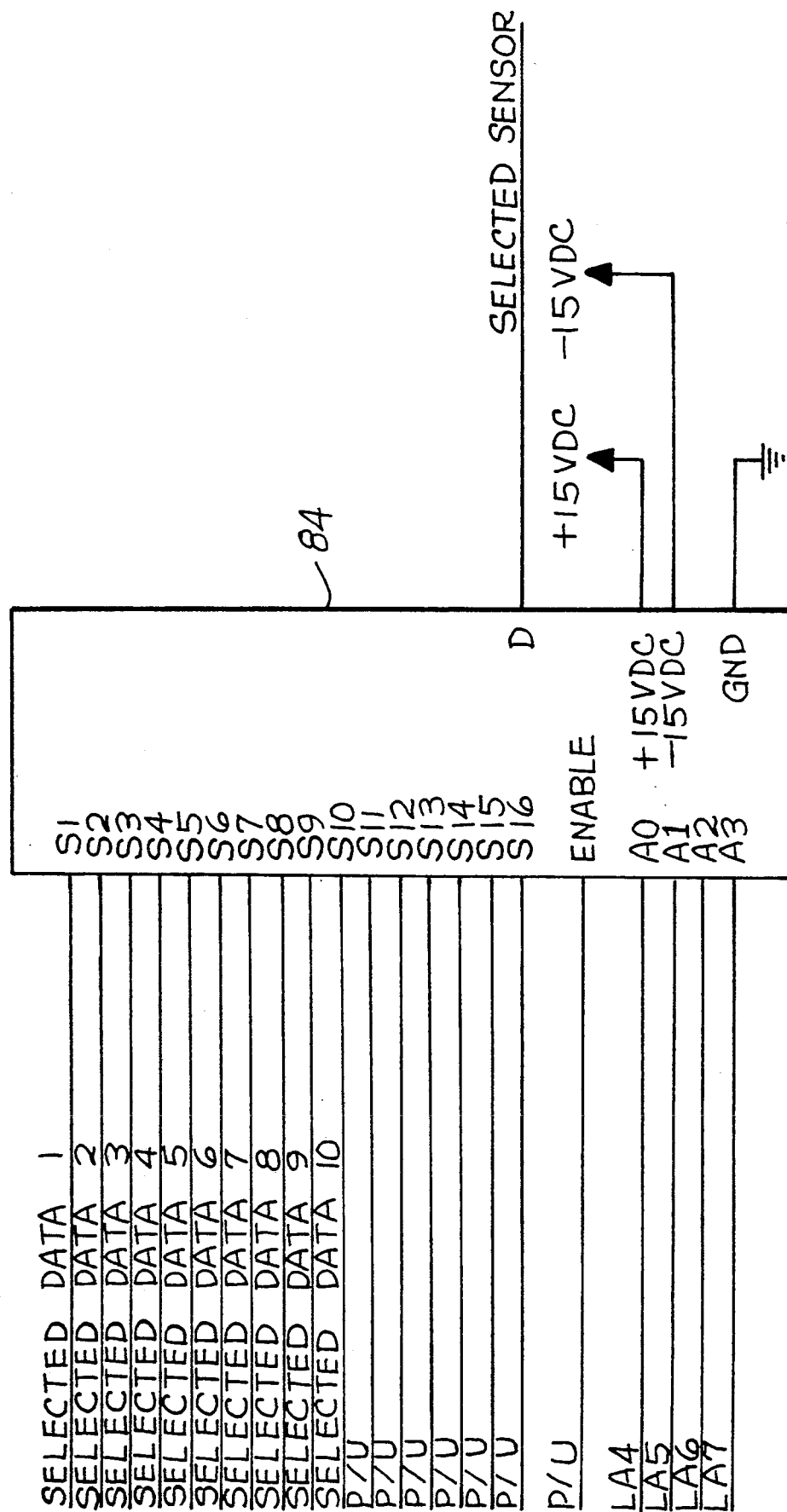
FIG. 21 is similar to FIG. 20 except that it shows the multiplexer in the second tier.

The output of the photodiode circuits is designated sense data 1, sense data 2, etc. in FIGS. 19A, 19B, and 20. These output signals are fed, in nine groups of sixteen and one group of six, into ten multiplexers 82. One of these multiplexers 82 is schematically illustrated in FIG. 20. The output signals of the ten multiplexers 82 are indicated by selected data 1 through selected data 10 in FIGS. 20 and 21. This output is fed into another multiplexer 84, as shown in FIG. 21. The multiplexers 82, 84 feed the amplified signals from the photodiode circuits into a memory port of a dual port memory computer 88. The signals are fed into the computer 88 one at a time in a known manner. Each signal is fed into the computer 88 through a noninverting amplifier 86 with a gain of 6. The amplifier 86 is of a known type and is illustrated by the circuit diagram in FIG. 22, wherein resistors are designated by the letter "R" and capacitors are designated by the letter "C". Address instructions LA0-LA7, provided by a sensor select portion of the computer 88 (FIG. 2), are input into the multiplexers 82, 84 to control the multiplexer outputs. The system is also provided with a standard latch circuit to control the input of the address instructions LA0-LA7 into the multiplexers in a known manner.

In the operation of the system of the invention, power is supplied to the LED circuitry shown in FIG. 11 to transmit light through each of the optical cables 12. The light in each cable 12 exits the cable 12 and is expanded and collimated by the corresponding lenses 56, 58. The six discrete light signals are expanded into the sheet of light 16 described above. The sheet of light 16 is projected across the inlet 2 toward the array of fiber ends in the receiver 18. The optical fiber end of each cable 20 collects a discrete sample of the sheet of light 16. This discrete sample is transmitted through the cable 20 to the corresponding photodiode 78. The electrical signal produced in response by the photodiode 78 is processed and fed into the computer 88, as described above.

The collimated light is directed across the inlet perpendicular to the flow. The light tangent to the leading edge of the normal shock is bent slightly downstream. This alters the intensity of light received by the optical fiber ends of the cables 20 that are in the "shadow" of the shock. The change in intensity of the light received by the optical cables 20 in the shadow produces a corresponding change in the electrical signal in the associated photodiodes 78. This in turn produces a change in the corresponding input into the computer 88.

Each of the 150 processed signals fed into the computer 88 is converted from an analog voltage signal to a digital signal by an analog to digital converter (FIG. 2) and is stored in a memory portion of the computer. The intensity profile formed by the 150 converted signals is compared to a predetermined baseline profile that corresponds to a no-shock condition. The computer identifies the position of the normal shook by identifying the sensors (fiber ends) with an intensity level deviating from the baseline profile. The computer 88 then communicates the shock position to the inlet control system. The inlet control system makes any necessary flow control adjustments to adjust the shook position. In most known types of inlet control systems, this is done by varying the geometry of the inlet. The flow control may be accomplished in a number of known ways and does not constitute a part of the present invention, which is directed toward the determination of the shock position.

The illustrated embodiment of the invention was operated in test conditions to provide a frequency of shock location measurements and feedback to the inlet control system of about 50 to 100 per second. Using the system of the invention, this frequency may be varied and may be increased to a frequency as high as about 1000 per second. However, in most circumstances, a frequency of 50 to 100 per second is sufficient to provide the information required by the inlet control system to accurately and reliably maintain the normal shock within predetermined permissible limits.

Both the transmitting and receiving portions of the system may be varied considerably without departing from the spirit and scope of the invention. For example, the focussing optics of the transmitter 14 could be replaced by expanding point sources of light. In this modification, the projected light would not be collimated. Another example is the use of imaging receiver optics. In addition, the input into the inlet control system could be optical, rather than electrical.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A method of detecting a normal shook in supersonic air flow, comprising:
   providing an array of sensors extending substantially parallel to said flow;
   projecting a sheet of light across said flow toward said array and perpendicular to said flow;
   allowing said shook to bend a portion of said sheet of light;
   sensing, through said array, an intensity profile of said sheet of light, and comparing said profile with a predetermined base line profile corresponding to a no-shook condition;
   identifying a position of the normal shock by identifying sensors with an intensity level deviating from said base line profile.

2. The method of claim 1, in which said sheet of light is collimated.

3. The method of claim 2, in which the step of providing an array of sensors comprises providing an array of optical fiber ends positioned to collect discrete samples of said sheet of light.

4. The method of claim 1, in which the step of providing an array of sensors comprises providing an array of optical fiber ends positioned to collect discrete samples of said sheet of light.

5. A method of detecting a normal shock in intake flow in a supersonic inlet of an aircraft power plant, comprising:
   providing an array of sensors along a sidewall of said inlet, said array extending substantially parallel to said flow;
   projecting a sheet of light across said inlet toward said array and perpendicular to said flow;
   allowing said shook to bend a portion of said sheet of light;
   sensing, through said array, an intensity profile of said sheet of light, and comparing said profile with a predetermined base line profile corresponding to a no-shock condition;
   identifying a position of the normal shock by identifying sensors with an intensity level deviating from said base line profile; and
   communicating the shock position to an inlet control system.

6. The method of claim 5, in which said sheet of light is collimated.

7. The method of claim 6, in which the step of providing an array of sensors comprises providing an array of optical fiber ends positioned to collect discrete samples of said sheet of light.

8. The method of claim 5, in which the step of providing an array of sensors comprises providing an array of optical fiber ends positioned to collect discrete samples of said sheet of light.

9. The method of claim 8, comprising carrying incoming light through an optical fiber from a remote light source to the vicinity of said inlet, and expanding said incoming light into said sheet of light.

10. The method of claim 5, comprising carrying incoming light through an optical fiber from a remote light source to the vicinity of said inlet, and expanding said incoming light into said sheet of light.

11. The method of claim 10, in which said sheet of light is collimated.

12. The method of claim 11, in which the step of providing an array of sensors comprises providing an array of optical fiber ends positioned to collect discrete samples of said sheet of light.

13. A system for detecting a normal shock in intake flow in a supersonic inlet of an aircraft power plant, comprising:

an array of light sensors along a sidewall of said inlet, said array extending substantially parallel to said flow;

a projector positioned to project a sheet of light across said inlet toward said array and perpendicular to said flow; and means for comparing an intensity profile of said sheet of light obtained through said array of sensors with a predetermined intensity profile corresponding to a no-shock condition, and for identifying a position of the normal shock by identifying sensors with an intensity level deviating from said predetermined profile.

14. The system of claim 13, in which said projector includes means for collimating said sheet of light.

15. The system of claim 14, in which said array includes an array of optical fiber ends positioned to collect discrete samples of said light.

16. The system of claim 13, in which said array includes an array of optical fiber ends positioned to collect discrete samples of said light.

17. The system of claim 16, in which said projector includes at least one optical fiber extending from a light source remote from said inlet to the vicinity of said inlet, and means for expanding incoming light from said fiber into said sheet of light.

18. The system of claim 13, in which said projector includes at least one optical fiber extending from a light source remote from said inlet to the vicinity of said inlet, and means for expanding incoming light from said fiber into said sheet of light.

19. The system of claim 13, in which said projector includes at least one optical fiber extending from a light source remote from said inlet to the vicinity of said inlet, and means for expanding incoming light from said fiber into said sheet of light and collimating said sheet of light.

20. The system of claim 19, in which said array includes an array of optical fiber ends positioned to collect discrete samples of said light.

* * * * *

UNITED STATES PATENT AND TRADEMARK OFFICE
CERTIFICATE OF CORRECTION

PATENT NO. : 5,072,612

DATED : December 17, 1991

INVENTOR(S) : Donald G. Iverson, Jr. and Troy D. Daiber

It is certified that error appears in the above-indentified patent and that said Letters Patent is hereby corrected as shown below:

Column 1, line 23, there is a period after "engine".
Column 1, line 49 and line 52, "shook" should be -- shock --;
Column 2, in lines 22 and 26, "shook" should be -- shock --;
Column 2, line 49, there is a period after "location".
Column 2, line 63, "shook" should be -- shock --.
Column 4, line 36, there is a period after "fibers"; and in line 46, there is a period after "system".
Column 5, in lines 67 and 68, "shook" should be -- shock --.
Column 6, line 2, "shook" should be -- shock --.
Column 7, in lines 33 and 38, "shook" should be -- shock --.
Claim 1, column 8, in lines 4, 10, and 15, "shook" should be -- shock --.
Claim 5, column 8, line 38, "shook" should be -- shock --.

UNITED STATES PATENT AND TRADEMARK OFFICE
CERTIFICATE OF CORRECTION

PATENT NO. : 5,072,612

DATED : December 17, 1991

INVENTOR(S) : Donald G. Iverson, Jr. et al

It is certified that error appears in the above-indentified patent and that said Letters Patent is hereby corrected as shown below:

Claim 10, column 8, line 65, "inlet." should be --inlet,--

Signed and Sealed this

Third Day of August, 1993

Attest:

MICHAEL K. KIRK

*Attesting Officer*            *Acting Commissioner of Patents and Trademarks*